June 5, 1962 G. L. LEITHISER, JR 3,037,720
CABLE TENSION BOOSTER
Filed Dec. 16, 1958 5 Sheets-Sheet 1

INVENTOR
GEORGE L. LEITHISER, JR.
BY Rommel, Allwein & Rommel
ATTORNEYS

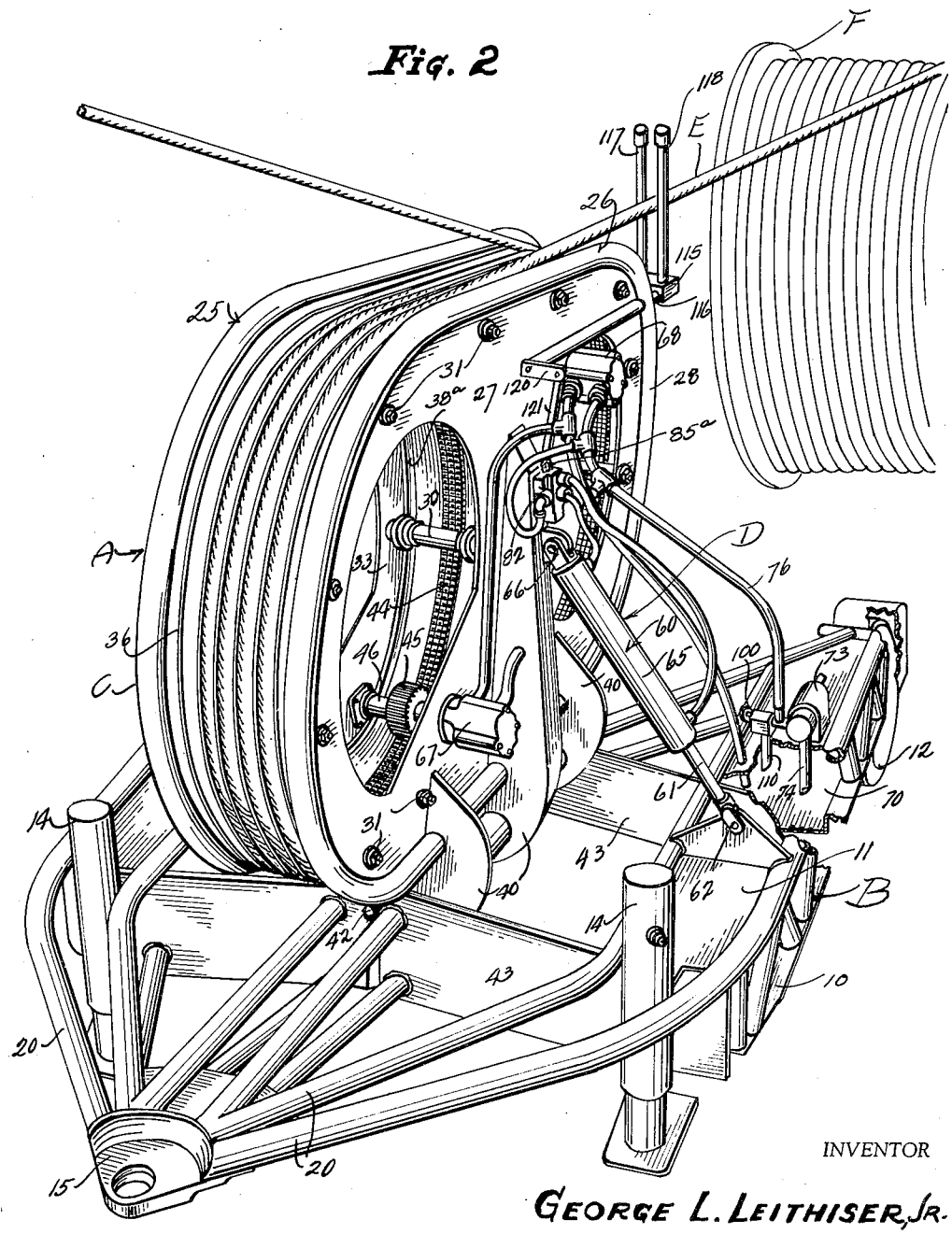

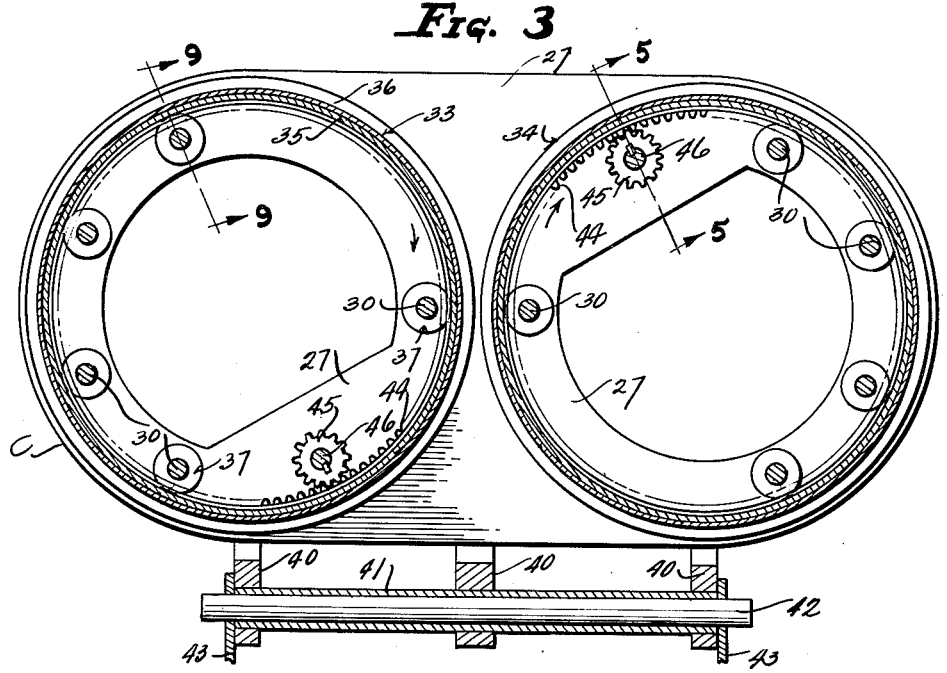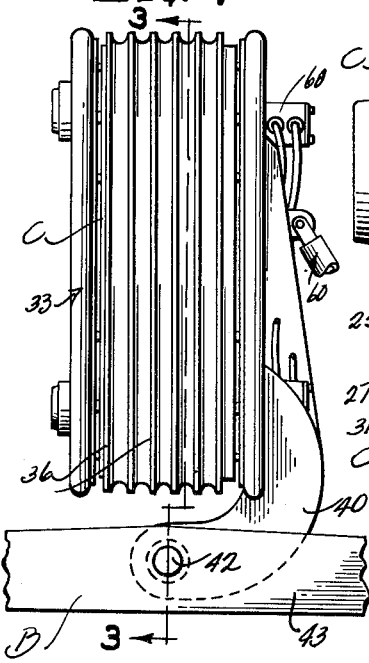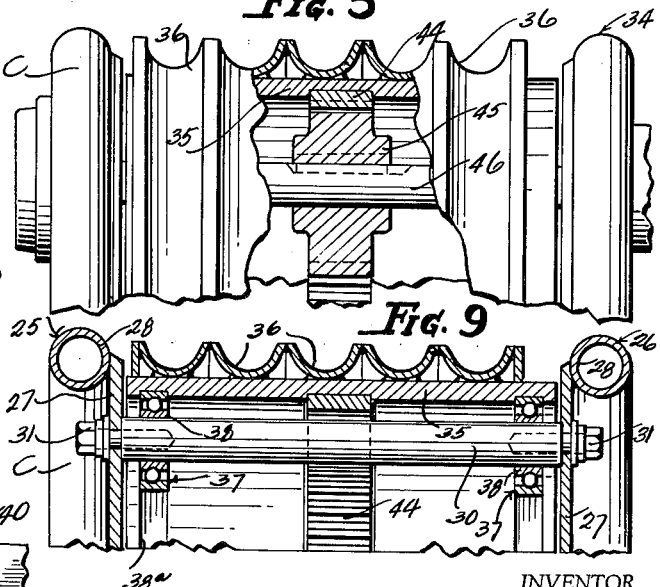

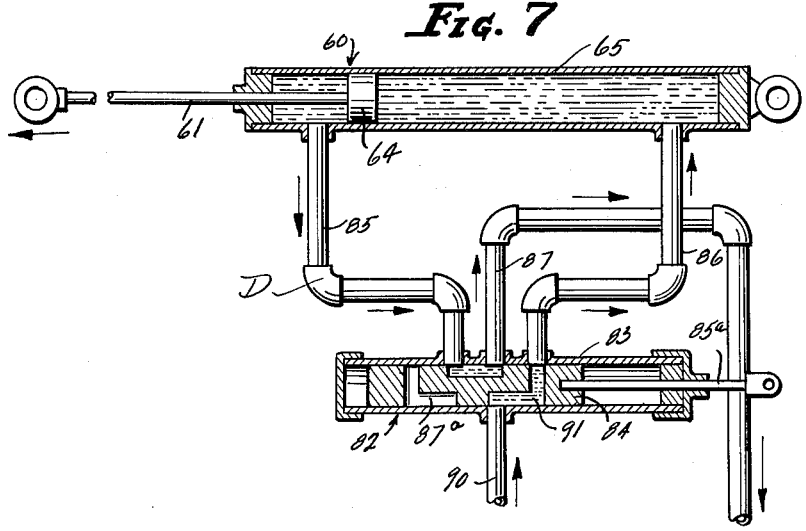
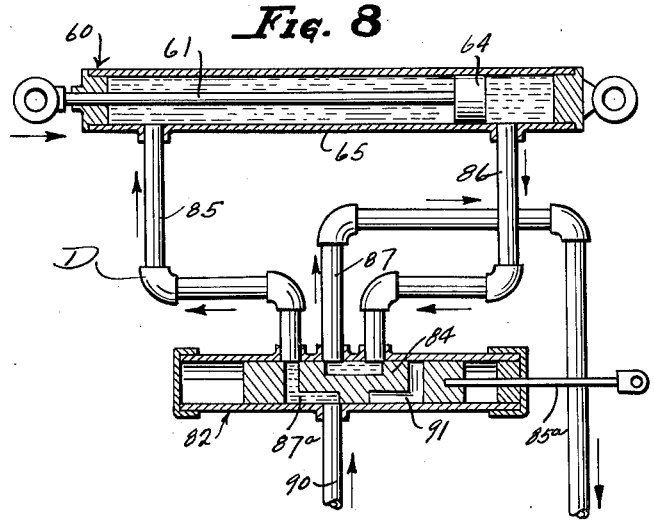

United States Patent Office 3,037,720
Patented June 5, 1962

3,037,720
CABLE TENSION BOOSTER
George L. Leithiser, Jr., R.D. 3, York, Pa.
Filed Dec. 16, 1958, Ser. No. 780,746
8 Claims. (Cl. 242—155)

This invention relates to equipment for applying uniform tension to electrical conductors during their installation on transmission structures.

The devices previously used consist mainly of crude methods of retarding rotation of the pay-out reel such as by the application of friction directly to the flange of the reel, or to the conductor, by means of a heavy plank of wood with weights applied. Friction type brakes have been used, where the friction is applied through a shoe or band bearing against a drum which in turn is mechanically connected to the cable reel. Inasmuch as the installation of high-tension electrical transmission lines must be performed over private properties, railroads, rivers and existing high tension lines and highways, the friction principle of retarding rotation of the pay-out reel has been found to be inadequate because of inherent lack of precise control under conditions of varying pulling speeds.

A further object of this invention is to provide a cable tensioning device which will, by virtue of its design and construction eliminate even the slightest damage to the surface of the electrical conductor being installed.

A great number of high tension transmission line installations are now being used with voltage pressures of 230 kv. and upwards. At these transmission voltages, any slight nick or scratch on the outer surface of the conductor will cause serious corona discharge, with attendant radio interference and conductor deterioration. Previous methods of retarding rotation of the pay-out reel have been conductive of such damage of the cable because of their unreliability in maintaining clearance between the conductor being installed and interfering objects. Previous devices utilizing a motion retarding effect on the reel cause considerable conductor damage because the tension of the conductor must be transferred to adjacent and underneath layers of the conductor on the reel.

It is a purpose of this invention to provide mobile equipment, classed as a semi-trailer, which may be readily transported to the job site and which will provide consistant and controllable retarding forces applied directly to the conductor at the smooth grooved surfaces of tandem capstan wheels, with provision being made to automatically align the capstan wheels with the point on the reel from which the conductor is paying-out in order to prevent scraping the conductor against an adjacent cable wrap on the reel.

A further object of this invention is the provision of a cable tension booster adapted to provide tension values adequate for stringing transmission lines where applied voltages, conductor characteristics and/or stringing conditions necessitate smooth, uniform tensioning.

A further object of this invention is the provision of a cable tension booster adapted to be used in connection with power driven or mounted reel trailers such as set forth in my co-pending application Serial No. 645,301, filed March 11, 1957.

Other objects and advantages of this invention will be apparent during the course of the following detailed description.

In the accompanying drawings, forming a part of this specification, and wherein similar reference characters designate corresponding parts throughout the several views:

FIGURE 2 is a perspective view of the improved cable tension booster showing the associated details thereof as mounted for tensioning of a cable being payed out from a supply reel.

FIGURE 3 is a cross sectional view taken through the plane of the capstan wheel assembly.

FIGURE 4 is an end view of the cable booster capstan wheel assembly.

FIGURE 5 is a fragmentary cross sectional view taken substantially on the line 5—5 of FIGURE 3.

FIGURE 7 is a fragmentary view showing the hydraulic system under operation for controlling the movement of the capstan wheel assembly in one direction as the cable is being uncoiled from the supply wheel.

FIGURE 8 is a view similar to FIGURE 7, but showing the operation of the fluid and valve means for controlling movement of the wheel assembly as the cable is being deployed from the cable supply reel at the opposite side thereof.

FIGURE 9 is a fragmentary cross sectional view taken substantially on the line 9—9 of FIGURE 3.

Figure 1:
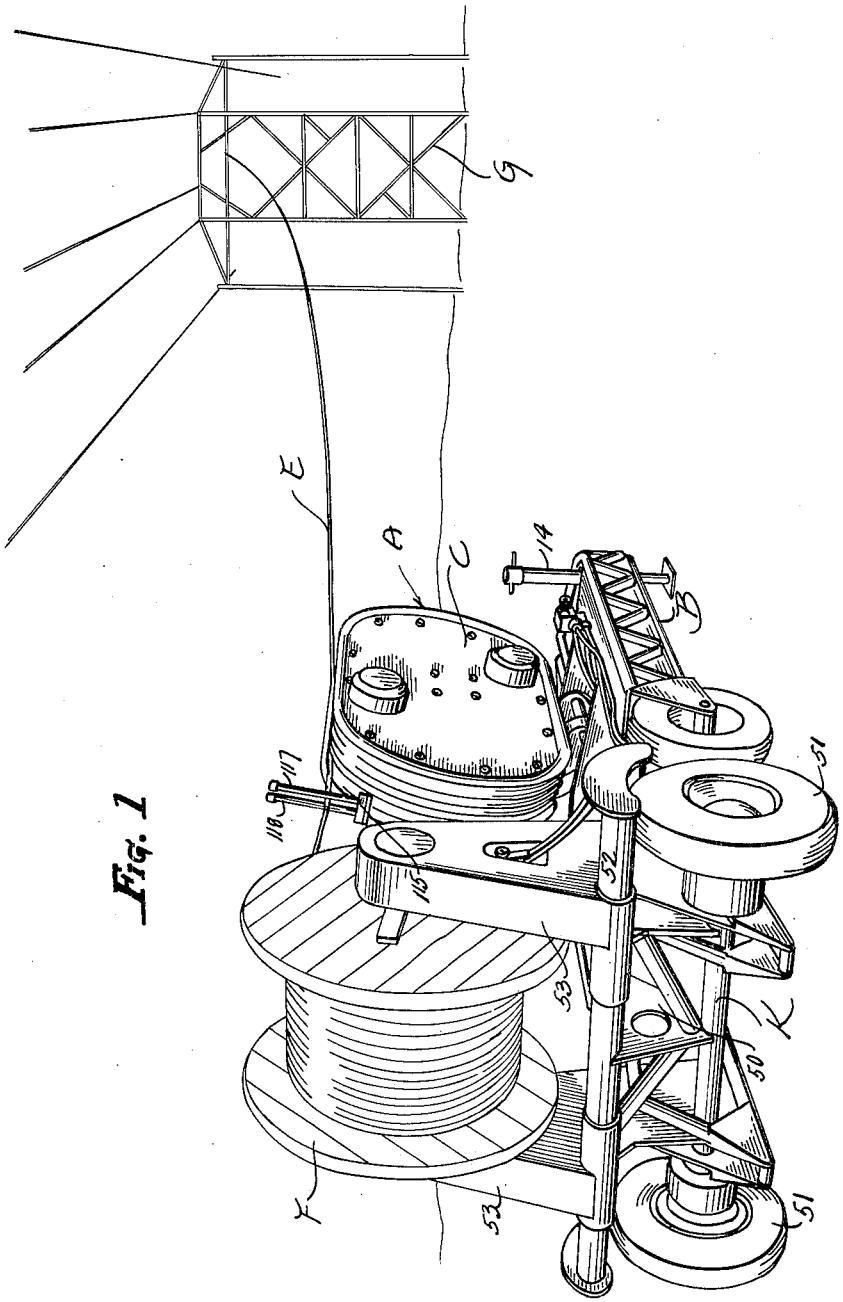
FIGURE 1 is a perspective view showing the electrical conductor or cable tension booster in position to receive cable from a reel and holding the same under tension during installation of the cable upon a transmission supporting tower.

In the drawings, wherein for the purpose of illustration is shown only a preferred embodiment of the invention, the letter A may generally designate the cable tension booster. It includes a chassis B having a capstan wheel assembly C movably mounted thereon. A hydraulic system D is associated with the capstan wheel assembly C to provide the necessary torque for tensioning the cable and to level the position of the reel assembly with respect to the cable being unwound from the supply reel.

The chassis B preferably includes a frame 10 of welded steel construction suitably braced for the purpose of withstanding the stress of the cable under tension passing around multiple booster sheaves. The deck 11 may be of any approved material, but is preferably expanded metal. Running gear 12 is provided as a part of the chassis for supporting the frame 10 including preferably two supporting wheels, and suitable hydraulic stabilizers 14, preferably arranged to stabilize the trailer when in use. A towing eye 15 is connected to the frame 10 by means of tubular members 20. By way of example, the cable tension booster of this invention is adapted to take care of tensioning cables of 1.750 inches in diameter and under, and in general, the size of the cable tension booster carriage for such purposes may be approximately 8 feet in width, 32 inches high at the deck, and 14 feet long.

The capstan wheel assembly C is mounted for transverse movement, preferably by hinging, upon the frame 10 of the chassis B. This assembly includes side frame pieces 25 and 26, each of which, as shown in FIGURE 9, includes a plate or wall portion 27 and tubular peripheral re-enforcement 28 welded to the plates. The plate portions 27 are bolted in spaced relation by means of rod portions 30, the ends of which are screw threaded to receive bolts 31. The frame pieces 25 and 26 are elongated in the line of the carriage for the purpose of receiving two capstan wheels, although the arrangement may be such as to receive more than two, if desired.

In the drawings, two capstan wheels 33 and 34 are provided, which are cylindrical in formation, each including a cylindrical drum portion 35 having welded externally thereon a series of circular groove providing segments 36, the centers of which are equidistant and which provide peripherally outwardly facing grooves to receive the coils of the cable being strung. It has been found that sufficient of these groove providing segments 36 will have to be furnished so that four complete coils of the cable may be wound upon the capstan wheels.

The capstan wheels 33 and 34 are rotatably supported upon the plate connecting shafts 30 by means of anti-friction bearings 37, the inner races 38 of which are secured as by shrinking upon the rods 30, and the outer races of which are rotatably supported upon the roller or ball bearings, as shown in FIGURE 9. In order that the capstan wheels will accurately track with respect to the anti-friction bearings 37, the same are internally provided with grooved track-ways 38$^a$ which guide the outer races of the anti-friction bearings 37 to properly space the ends of the frame plates 27.

One of the plates 27 of the casing structure of the assembly C is provided with fixed hinge extensions 40, preferably three in number, as shown in FIGURE 3, which bear upon cylindrical tubing 41 mounted upon a hinge pin 42. The latter is supported upon the framework end of the chassis B by means of supporting brackets or standards 43. The axial line of the hinge pin 42 lies in a plane which preferably intersects the center plane of the capstan wheels between the sides thereof, as shown in FIGURE 4. This mode of pivoting the capstan wheels and the supporting framework therefor enables the assembly to move laterally in either direction upon the hinge pin 42, as an axis, as will be apparent from FIGURE 4 of the drawings.

The ball-bearing assemblies 37 position each of the capstan wheels 33 and 34 both radially and in thrust because they fit within the guide grooves 38$^a$ of the capstan wheels, as shown in FIGURE 9.

Power transmission from the cable to the hydraulic system D is achieved, as follows: An internal ring gear 44 is fixed midway between the ends of each cylinder portion 35 of each capstan wheel, as shown in FIGURE 9. It meshes with a pinion gear 45, keyed upon a shaft 46. The latter bears in the plates 27 of the assembly C. The shaft 51 at an end thereof is connected with the hydraulic mechanism D in a relation to be subsequently described.

With the cable tension booster A is adapted to be used a supply reel F having wound thereon the cable E. This reel F may be mounted upon a reel trailer (see FIGURE 1) which includes a frame 50 having wheels 51 supporting the same and including a power actuated shaft 52 which may move the arms 53 supporting the reel F from the ground to elevated positions as shown in FIGURE 1 or vice versa, in a manner which has been described in my co-pending application Serial No. 645,301, filed March 11, 1957.

Referring to the hydraulic system D, and more particularly in reference to FIGURES 2, 6, 7 and 8, the alignment tilting action of the capstan wheels is effected by means of a double acting hydraulic mechanism 60, shown in FIGURE 2, which includes a piston rod 61 pivoted by means of a clevis at 62 upon the frame 10 of the chassis C, and the piston 64 of which slides within a cylinder 65; the latter being pivoted at 66 upon the frame structure housing the capstan wheels, as shown in FIGURE 2. Flow of fluid in either direction within the cylinder will cause the capstan wheel assembly to tilt or move. The rear and fore capstan wheels 33 and 34 have the pinion shafts 46 connected to hydraulic motor pumps 67 and 68 respectively. These hydraulic motor pumps are of the rotor vane type being adapted to receive hydraulic oil for operation thereof. A hydraulic fluid supply reservoir 70 is mounted upon the framework 10 of the chassis B, as a part thereof. It has been shown broken away in FIGURE 2 and houses a supply of hydraulic oil 71. A pump 73 is likewise mounted upon the chassis and has a suction line 74 connected with the reservoir for supply of the oil 71 thereto. Pipe lines 75 and 76 respectively connect the hydraulic motor pumps 67 and 68 with the reservoir 70 for transmission of oil therefrom to the motor pumps 67 and 68. A coupling 77 has a line 78 connected thereto leading to the outlet 79 of the pump 73 and through which line may travel the oil under varying pressures. The coupling 77 has pipe lines 80 and 81 respectively connected to the hydraulic motor pumps 67 and 68.

A standard conventional single spool four-way valve mechanism 82 is provided for controlling the flow of oil from the hydraulic system into the cylinder 65 and this comprises a casing 83 having a slidable valve 84 disposed therein to which an extension rod 85$^a$ is connected.

Figure 6:
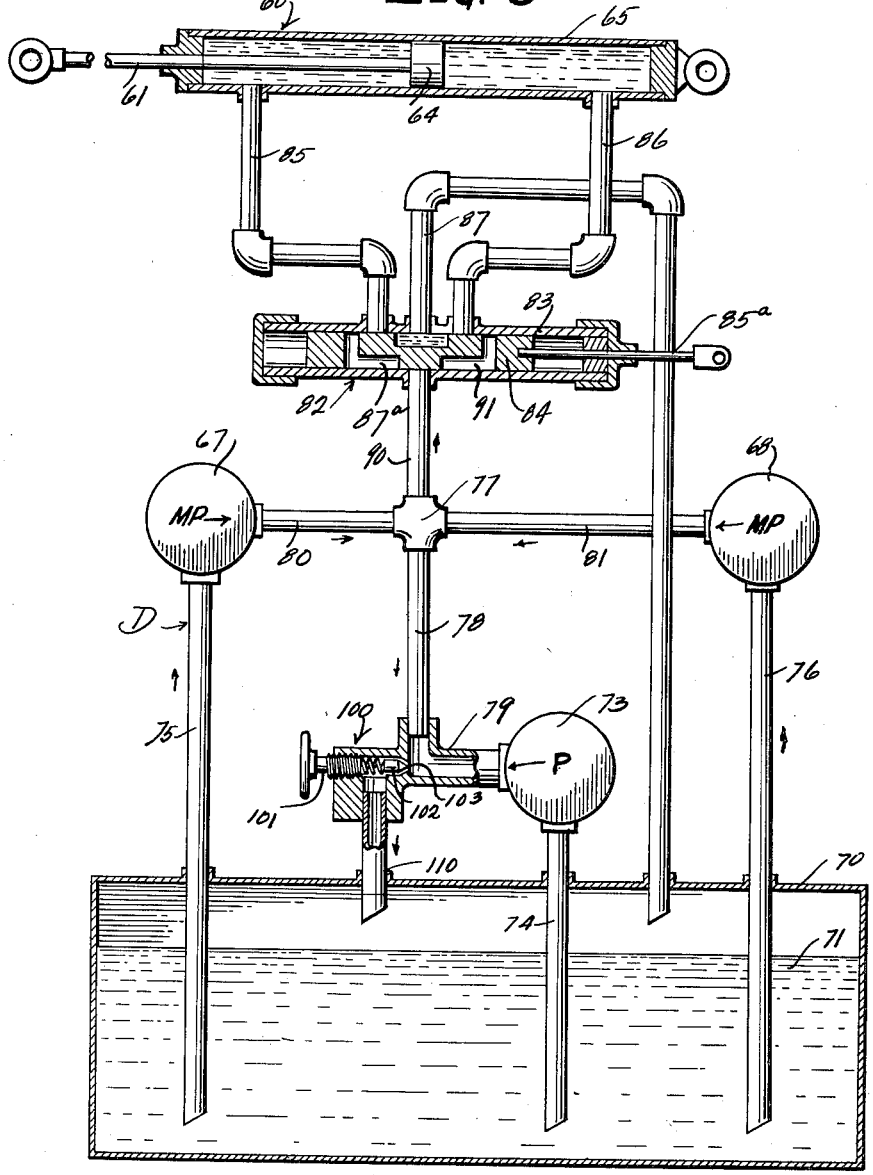
FIGURE 6 is a diagrammatic view showing the hydraulic system which is associated with the capstan wheel assembly to provide the necessary torque for tensioning a cable and to control the position of the booster with respect to the line of the cable being uncoiled from a supply reel.

The cylinder 65 on opposite sides of the piston 64 is provided with pipeline connections 85 and 86 extending to and opening into the valve casing 83 at opposite sides of a pipeline 87. The latter extends to and opens into the top of the reservoir 70, as shown in FIGURE 6. The valve 84 has a duct or port 87$^a$ therein for lines 85 and 90 and a duct 91 therein for lines 86 and 90, as shown in FIGURE 6.

In the operation of the cable tension booster, the reel F is free to turn at minimum tension to pay out the conductor E. Means is applied at the remote or other end of the conductor installation, such as at the tower G, shown in FIGURE 1, to exert pulling force upon the conductor E. This pulling force causes rotation of the capstan wheels 33 and 34 as shown by the arrows in FIGURE 3. The rotation of the capstan wheels through meshing of the teeth of the ring gear 44 with the pinion 45 causes rotation of the shaft 46 for actuating the hydraulic motor pumps 67 and 68. The torque transferred to the hydraulic motor pumps 67 and 68 is converted to fluid pressure; the hydraulic fluid passing from motor pump 67 through line 80 and the hydraulic fluid from the motor pump 68 passing through line 81. The pump 73 pumps hydraulic fluid from the reservoir through line 74 against the relief valve 100, which limits the hydraulic pressure at the valve seat 103 to the manual setting of valve 102 of the relief valve stem 101. Excess hydraulic fluid spilled by the relief valve returns to the reservoir through a line 110. It will thus be seen that the pressure developed by hydraulic pump 73 meeting the pressure developed by hydraulic motor pumps 67 and 68 will be regulated by the action of the relief valve 100. Variations in the manual setting of the valve 100 and the resulting control of pressures at the hydraulic motor pumps 67 and 68 will result in adjusted but even retarding forces supplied through the hydraulic motor pumps 67 and 68 upon the capstan wheels, and thence to the conductor E. It will be noted that both the fore and aft capstan wheel assemblies are, through the hydraulic motor pumps and pipeline connections above mentioned, coupled in hydraulic parallelism so that each will assume its share of the retarding force.

In order to insure that the fleet angle of the conductor between the supply reel F and the booster A will be held to a minimum, a control has been provided to tilt the capstan wheels, through the hydraulic cylinder and piston mechanism 60 above described. This means preferably comprises a lever arm 115 which is secured to a shaft 116. Upon the lever 115 are mounted upright control fingers or rods 117 and 118, in spaced relation. They may be adjustable mounted (not shown) so as to vary the spacing therebetween. The lever 115 is welded to the shaft 116; the shaft 116 at its remote end from the fingers being secured to a clevis arm 120 which has a clevis link 121 connected thereto and secured to the valve stem 85$^a$ of the standard commercial single spool four-way valve 82.

As the conductor E uncoils from its reel F, it will move from one side of the reel to the other. Motion of the conductor laterally will be transferred to the control fingers 117 and 118. In turn, such motion is transferred to the linkage above described to operate the valve 84. Hydraulic pressure will be built up in the line 78 shown in FIGURE 6 when the device is in operation. This pressure is tapped off at the connection 77 and is led through the line 90 to the inlet of the valve casing 83. If the conductor E touches the control finger 118, the valve stem 85ª will move valve 84 into position to allow the fluid under pressure in line 90 to enter the cylinder 65 at 85 (see FIGURE 8). This force applied to the piston 64 will move the capstan assembly C sidewise until the conductor E no longer touches the control finger 118. Thus, the alignment of the conductor between the reel A and the first groove of the above-most capstan wheel will be corrected. The conductor E touching the control finger 117 will cause an identical but opposite motion, as will be apparent from the foregoing.

It will be seen from the above description that nothing has been introduced in the guiding of the conductor E on the application of tension that would tend to mar or scratch the surfacing of the electrical conductor E.

In the event it is desired reduction gearing may be provided upon the shaft 46 at the hydraulic motor pumps 67 and 68.

Various changes in the shape, size and arrangement of parts may be made to the form of invention herein shown and described, without departing from the spirit of the invention or scope of the claims.

I claim:

1. In a cable tension booster assemblage, the combination of a supporting chassis, a frame, means mounting the frame upon said chassis for sidewise movement thereon, a plurality of capstan wheels rotatably mounted upon said frame on parallel axes transverse to the frame and with the wheels disposed in the same plane, hydraulic means upon the chassis and frame for retarding rotation of said wheels, and means controlled by the paying out of cable from a supply source to said capstan wheels for regulating sidewise movement of said capstan wheel frame.

2. In a cable tension booster, in combination with a cable supply reel having a cable coiled thereon and means for rotatably supporting the reel for rotation, a supporting chassis, a frame mounted on the chassis for lateral movement thereon, a capstan wheel rotatably carried by the frame having grooves thereon for receiving coils of cable extending from said reel as the cable is payed out from said reel, guide means movably connected to said frame including members thereon disposed at opposite sides of the cable as it extends from the reel to the capstan wheel, and means actuated by movement of the members of the guide means as they contact the cable for laterally moving the said frame to align the grooves of the capstan wheel with the position of the cable coil being payed out from said reel.

3. A booster as described in claim 2 in which the means actuated by said guide means comprises a double acting hydraulic cylinder and piston assembly operatively connected to said chassis and frame, a valve for controlling flow of hydraulic fluid to and from said cylinder at opposite sides of the piston thereof, and means connecting the guide means to said valve for regulating the valve through movement of the members of the guide means.

4. In a cable tension booster, the combination of a supporting chassis, a frame, means movably mounting the frame upon the chassis for sidewise movement upon the chassis, capstan wheel means rotatably supported by said frame on a transverse axis on the frame and bodily movable with the frame as it is moved sidewise, said capstan wheel means being grooved to receive convolutions of a cable being payed out under a pulling force remote from the booster, hydraulic actuated motor pump means geared to said wheel means for retarding rotation of the wheel means in order to tension the cable as it is drawn from said wheel means, hydraulic means for supplying the desired hydraulic fluid retarding force to said motor pump means, hydraulic means connected to the motor frame and the chassis for moving the frame sidewise upon the chassis and the wheel means therewith, and means to control the fluid of the last mentioned hyraulic means to effect sidewise degree of movement of the frame comprising a control operated by the position of the cable as it is fed to said wheel means.

5. A cable tension booster as defined in claim 4 in which the frame for sidewise movement has a pivot on said chassis with its axis lengthwise of the cable as it is payed out from the wheel means.

6. In a cable tension booster, the combination of a supporting chassis, a frame, a plurality of cable receiving capstan wheels rotatably supported upon the frame on parallel axes, means mounting the frame upon said chassis for sidewise movement in a plane transverse to the plane in which the capstan wheels lie, a hydraulic motor pump mounted on said frame for each of the capstan wheels, means gearing the hydraulic motor pumps to the respective capstan wheels, hydraulic means operating the hydraulic motor pumps tending to retard the paying out action of the cable from the wheels, means for control pressure feeding of hydraulic fluid to said hydraulic motor pumps whereby to selectively regulate rotation of said wheels against a force acting to pay out the cable from said wheels, and hydraulic means normally actuated by lateral positioning of the cable as it enters upon the capstan wheels to control sidewise movement of the capstan wheels upon the chassis frame.

7. In combination with a cable supply reel having a supply of cable wound thereon, a cable tension booster comprising a supporting chassis, a frame mounted upon the supporting chassis, a capstan wheel rotatably supported upon said frame grooved to receive the cable from the supply reel in coiled relation thereon, a hydraulic motor pump, means for supplying fluid to the hydraulic motor pump, valve means for varying the supply of fluid to said hydraulic motor pump, means gearing the hydraulic motor pump to said capstan wheel to selectively retard cable paying out rotation of the wheel according to the degree of pressure upon the hydraulic fluid of said motor pump, and means to provide sideways movement of the capstan wheel upon said frame comprising a hydraulic piston and cylinder arrangement connecting the frame of the capstan wheel to said chassis, and hydraulic means to actuate the piston of said cylinder for moving the frame laterally upon the chassis.

8. A cable tension booster as described in claim 7 in which means is provided for regulating the flow of fluid to the piston of said cylinder under automatic control by the lateral position of the cable paid out from the reel onto the capstan wheel.

References Cited in the file of this patent

UNITED STATES PATENTS

| | | |
|---|---|---|
| 2,647,699 | Bush | Aug. 4, 1953 |
| 2,660,382 | Wilson | Nov. 24, 1953 |
| 2,759,684 | Cross | Aug. 21, 1956 |
| 2,947,494 | Merritt | Aug. 2, 1960 |

FOREIGN PATENTS

| | | |
|---|---|---|
| 474,250 | Italy | Sept. 13, 1952 |
| 703,919 | Great Britain | Feb. 10, 1954 |